F. H. STONER.
LAND ROLLER.
APPLICATION FILED DEC. 2, 1916.

1,248,945.

Patented Dec. 4, 1917.

Inventor
Frank H. Stoner

By Whittemore Hulbert & Whittemore
Attorneys

UNITED STATES PATENT OFFICE.

FRANK H. STONER, OF MONROE, MICHIGAN, ASSIGNOR TO WILDER-STRONG IMPLEMENT COMPANY, OF MONROE, MICHIGAN, A CORPORATION OF MICHIGAN.

LAND-ROLLER.

1,248,945.  Specification of Letters Patent.  Patented Dec. 4, 1917.

Application filed December 2, 1916. Serial No. 134,561.

*To all whom it may concern:*

Be it known that I, FRANK H. STONER, a citizen of the United States of America, residing at Monroe, in the county of Monroe and State of Michigan, have invented certain new and useful Improvements in Land-Rollers, of which the following is a specification, reference being had therein to the accompanying drawings.

The invention relates to land-rollers of that type in which a cylindrical metallic shell is provided with flanged heads engaging the same, the ends of the cylinder and adjacent flanges of the heads being turned inward to form a rounded end, and also being welded together. In the present state of the art the usual method of forming such structure is to first engage the flanged heads with the straight cylinder, then to spot-weld the flanges to the cylinder, then to turn in the adjacent end portions of the cylinder and flanges to form the desired curve and finally to seam-weld the turned-in ends of the flange and cylinder. With my improvement, the process is simplified and results in an improved structure, as hereinafter set forth.

A is the cylinder shell of the land-roller, and B is an end head therefor, which is provided with the outwardly-extending flange C fitting within the cylinder. It is one of the objects of the invention to form the welded joint between the flange and the shell prior to the bending or turning-in of these parts to form the rounded end. As heretofore constructed it is not practicable to do this, for the reason that in the turning-in of the end of the shell the metal of the flange is placed under such compression as to overstrain the welded joint. This I have avoided by forming at the outer end of the flange a rounded bead D, which when the metal is subsequently turned and compressed will form a yielding portion for relieving the stress. I further obtain a stronger weld by turning the end of the flange C outward so as to lie adjacent to the end face of the cylindrical shell, and during welding this overlapping portion is rounded off to form a complementary portion to the rounded bead.

Figure 1:
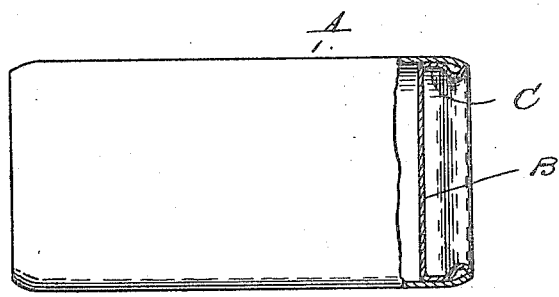
Figure 1 is a sectional elevation of a land-roller embodying my invention.
Figure 2:
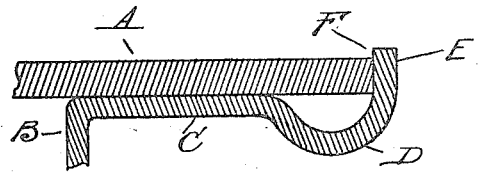
Fig. 2 is a section showing the first step of the process.
Figure 3:
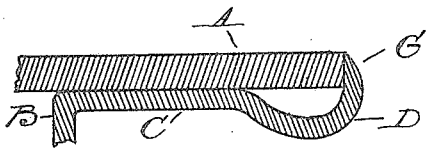
Fig. 3 is a similar view showing the second step.
Figure 4:
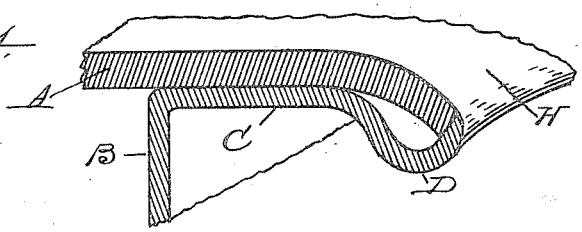
Fig. 4 is a sectional perspective view showing the completed article.

In detail, the flange C of the head is formed with the inwardly-projecting bead D terminating in the outwardly-extending flange E which overlaps the end face of the shell A and preferably extends slightly beyond the same, as indicated at F. The seam-welding is then performed and the hot metal is rolled to form the rounded corner G, as indicated in Fig. 3, and which forms a continuation of the rounded bead, the latter taking care of the metal which extended slightly beyond the face of the shell. The end of the shell is then turned inward, as shown at H in Fig. 4, and during this operation the stress resulting from the shortening of the flange C is taken care of by expansion of the bead D. When complete the roll is provided with a rounded end which will not dig into the earth, and which is superior to anything formed by methods heretofore used.

What I claim as my invention is:

1. In a land-roller, the combination with a cylindrical shell, of a head having an outwardly-extending flange fitting within the end portion of said shell and terminating in a rounded hollow bead secured thereto, said end portion and flange being turned inward.

2. In a land-roller, the combination with a cylindrical shell having a turned-in end portion, of a head within said shell having an outwardly-extending flange fitting within and conforming to the shape of said shell, the outer end of said flange terminating in a rounded hollow bead welded to the shell.

3. The combination with a cylindrical shell having a turned-in end portion, of a head fitting within said shell, provided with an outwardly-extending flange conforming to said turned-in end portion and terminating in an inwardly extending hollow bead overlapping the end face of the shell and secured thereto.

4. The combination with a cylindrical shell having a turned-in end portion, of a head fitting within said shell, provided with an outwardly-extending flange conforming to the shape of the shell and terminating in an inwardly-extending hollow bead overlapping the end face of the shell and welded thereto, the welded joint being rounded to form a complementary portion of the bead.

In testimony whereof I affix my signature.

FRANK H. STONER.